United States Patent
Nojiri

(10) Patent No.: US 12,503,215 B2
(45) Date of Patent: Dec. 23, 2025

(54) ATTITUDE DETECTION DEVICE

(71) Applicant: HONDA MOTOR CO., LTD., Tokyo (JP)

(72) Inventor: Daisuke Nojiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 17/841,708

(22) Filed: Jun. 16, 2022

(65) Prior Publication Data

US 2022/0402589 A1 Dec. 22, 2022

(30) Foreign Application Priority Data

Jun. 21, 2021 (JP) .................. 2021-102608

(51) Int. Cl.
 *B63H 25/36* (2006.01)
 *B63H 25/04* (2006.01)
(52) U.S. Cl.
 CPC ............. *B63H 25/36* (2013.01); *B63H 25/04* (2013.01)
(58) Field of Classification Search
 None
 See application file for complete search history.

(56) References Cited

U.S. PATENT DOCUMENTS

| | | | |
|---|---|---|---|
| 2017/0015265 A1* | 1/2017 | Watanabe | B60R 21/0132 |
| 2017/0088235 A1* | 3/2017 | Monk | B63B 27/14 |
| 2021/0107617 A1* | 4/2021 | Nakatani | B63H 25/44 |

FOREIGN PATENT DOCUMENTS

JP 2021-062709 4/2021

* cited by examiner

*Primary Examiner* — James J Lee
*Assistant Examiner* — Andrew Sang Kim
(74) *Attorney, Agent, or Firm* — Amin, Turocy & Watson, LLP

(57) ABSTRACT

An attitude detection device includes a rudder angle sensor, a speed sensor, an inertia sensor, and a control device. The rudder angle sensor detects a rudder angle of a ship. The speed sensor detects a speed of the ship. The inertia sensor detects information related to an inertial force applied to the ship. The control device finds a centrifugal force applied to the ship on the basis of a signal output from each of the rudder angle sensor and the speed sensor. The control device acquires an inclination of the ship on the basis of the signal output from the inertia sensor. The control device corrects the inclination of the ship on the basis of the output of the inertia sensor according to the centrifugal force applied to the ship.

1 Claim, 2 Drawing Sheets

ATTITUDE DETECTION DEVICE

CROSS-REFERENCE TO RELATED APPLICATION

Priority is claimed on Japanese Patent Application No. 2021-102608, filed Jun. 21, 2021, the content of which is incorporated herein by reference.

BACKGROUND OF THE INVENTION

Field of the Invention

The present invention relates to an attitude detection device.

Description of Related Art

In the related art, for example, a system that calculates the roll angle of the ship hull on the basis of a signal output from an attitude sensor such as a gyro sensor or the like and that controls an attitude of a ship hull such that the roll angle calculated during turning of the ship hull approaches an angle in which a direction of a resultant force between a centrifugal force and a gravitational force forms with respect to a direction of gravity is known (for example, see Japanese Unexamined Patent Application, First Publication No. 2021-62709).

SUMMARY OF THE INVENTION

Incidentally, in the system like that disclosed in the related art, since an attitude sensor such as a gyro sensor, an acceleration sensor, or the like detects a centrifugal force during turning of a ship hull, for example, even when inclination of the ship hull is the same, there is a problem that a signal of a detection value output from the attitude sensor fluctuates due to application of a centrifugal force.

An aspect of the present invention provides an attitude detection device capable of appropriately detecting an attitude of a ship.

(1) An attitude detection device (for example, an attitude detection device (10) according to an embodiment) according to an aspect of the present invention includes a rudder angle sensor (for example, a rudder angle sensor (11) according to the embodiment) configured to detect a rudder angle of a ship (for example, a ship (1) according to the embodiment) and output a signal of a detection value of the rudder angle, a speed sensor (for example, a speed sensor (13) according to the embodiment) configured to detect a speed of the ship and output a signal of a detection value of the speed, an inertia sensor (for example, an inertia sensor (15) according to the embodiment) configured to detect an inertial force applied to the ship and output a signal of a detection value of information related to the inertial force, and a processing device (for example, a control device (17) according to the embodiment) configured to acquire an inclination of the ship on the basis of the signal output from the inertia sensor and to correct the inclination on the basis of the signal output from each of the rudder angle sensor and the speed sensor.

(2) In the attitude detection device according to the aspect of the above-mentioned (1), wherein the processing device may acquire a centrifugal force applied to the ship on the basis of the signal output from each of the rudder angle sensor and the speed sensor and may correct the inclination of the ship, which is acquired on the basis of an acceleration detected by the inertia sensor, on the basis of the centrifugal force.

According to the aspect of the above-mentioned (1), it is possible to appropriately detect the attitude of the ship 1 by providing the processing device configured to correct the inclination of the ship based on the output of the inertia sensor on the basis of the output of each of the rudder angle sensor and the speed sensor.

In the case of the aspect of the above-mentioned (2), it is possible to appropriately detect the inclination of the ship even when the acceleration detected by the inertia sensor changes according to the centrifugal force applied to the ship by providing the processing device configured to correct the inclination of the ship acquired on the basis of the acceleration detected by the inertia sensor on the basis of the centrifugal force.

DETAILED DESCRIPTION OF THE INVENTION

Hereinafter, an attitude detection device 10 according to an embodiment of the present invention will be described with reference to the accompanying drawings.

Figure 1:
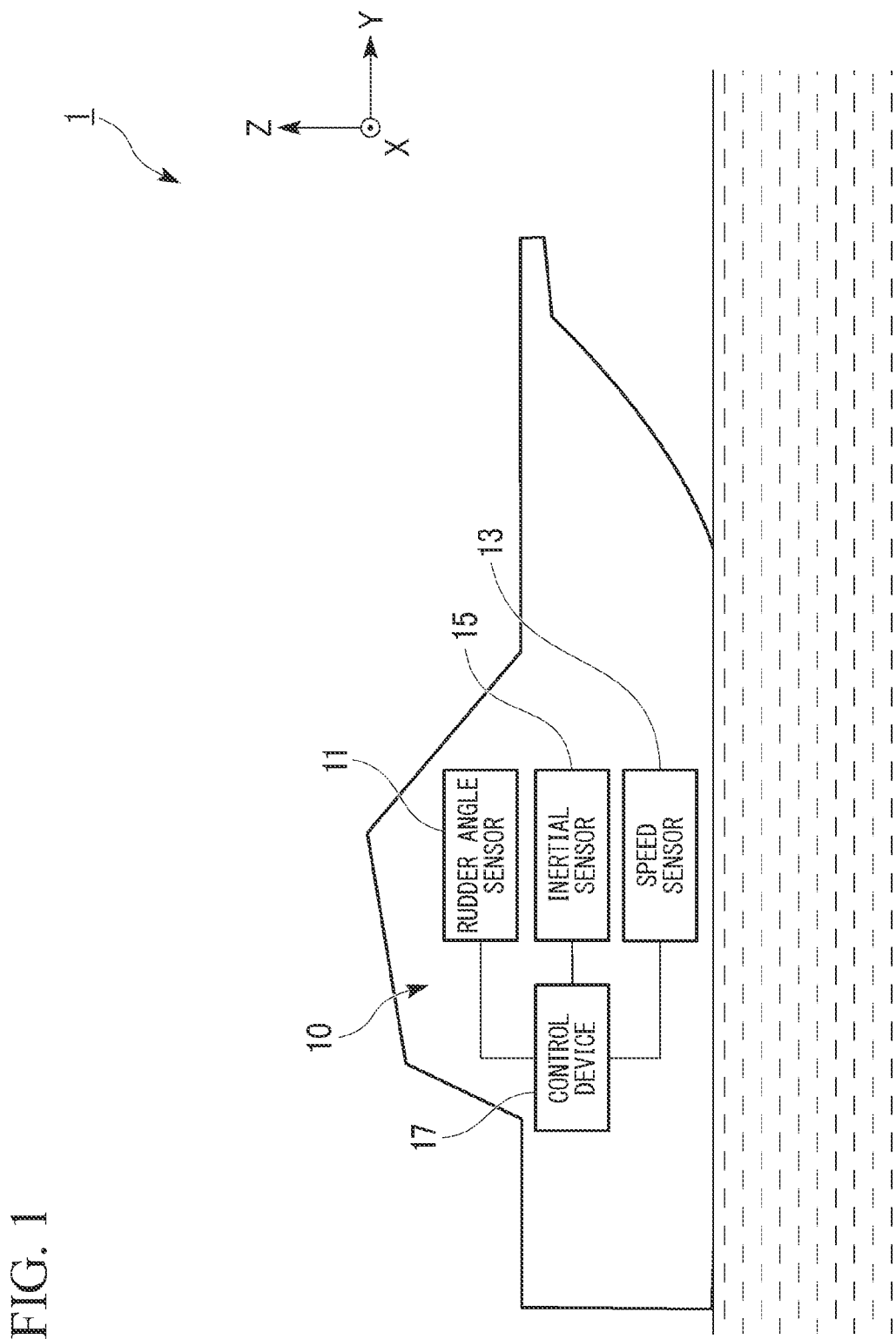
FIG. 1 is a configuration view of a ship on which an attitude detection device according to an embodiment of the present invention is mounted.

FIG. 1 is a configuration view of a ship 1 on which the attitude detection device 10 according to the embodiment is mounted.

In the following, axial directions of an X axis, a Y axis and a Z axis, which are perpendicular to each other in a 3-dimensional space, are directions parallel to each of the axes. For example, as shown in FIG. 1, the Z-axis direction is parallel to a vertical direction, and the X-axis direction and the Y-axis direction are parallel to a horizontal direction. The X-axis direction is parallel to a leftward/rightward direction of the ship 1, for example, when an upward/downward direction of the ship 1 is parallel to the Z-axis direction. The Y-axis direction is parallel to a forward/rearward direction of the ship 1, for example, when the upward/downward direction of the ship 1 is parallel to the Z-axis direction.

As shown in FIG. 1, the attitude detection device 10 according to the embodiment is mounted on the ship 1.

The attitude detection device 10 includes, for example, a rudder angle sensor 11, a speed sensor 13, an inertia sensor 15, and a control device (processing device) 17.

The rudder angle sensor 11 detects a rudder angle or a steering angle of the ship 1, and outputs a signal of a detection value of the rudder angle or the steering angle.

The speed sensor 13 detects a speed (i.e., a counter-water speed) of the ship 1, and outputs a signal of a detection value of the speed.

The inertia sensor 15 includes, for example, a multi-axis acceleration sensor. The inertia sensor 15 detects an inertial force applied to the ship 1, and outputs a signal of a detection value of information (for example, an acceleration or the like) related to the inertial force.

The control device 17 generally controls, for example, the ship 1 as a whole. The control device 17 is, for example, a software function part that functions when a predetermined program is executed by a processor such as a central processing unit (CPU) or the like. The software function part is an electronic control unit (ECU) including a processor such as a CPU or the like, a read only memory (ROM) in which a program is stored, a random access memory (RAM) in which data is temporarily stored, and an electronic circuit such as a timer or the like. Further, at least a part of the control device 17 may be an integrated circuit such as large scale integration (LSI) or the like.

The control device 17 acquires a centrifugal force applied to the ship 1 according to predetermined calculation, map reference, or the like based on the signal output from each of the rudder angle sensor 11 and the speed sensor 13. The centrifugal force applied to the ship 1 changes with an increasing tendency according to an increase in each of the rudder angle or the steering angle of the ship 1 and the speed of the ship 1.

The control device 17 acquires an inclination of the ship 1 according to the predetermined calculation, map reference, or the like based on the signal output from the inertia sensor 15. The inclination of the ship 1 is an angle of the upward/downward direction of the ship 1 with respect to the vertical direction (i.e., the Z-axis direction).

Figure 2:
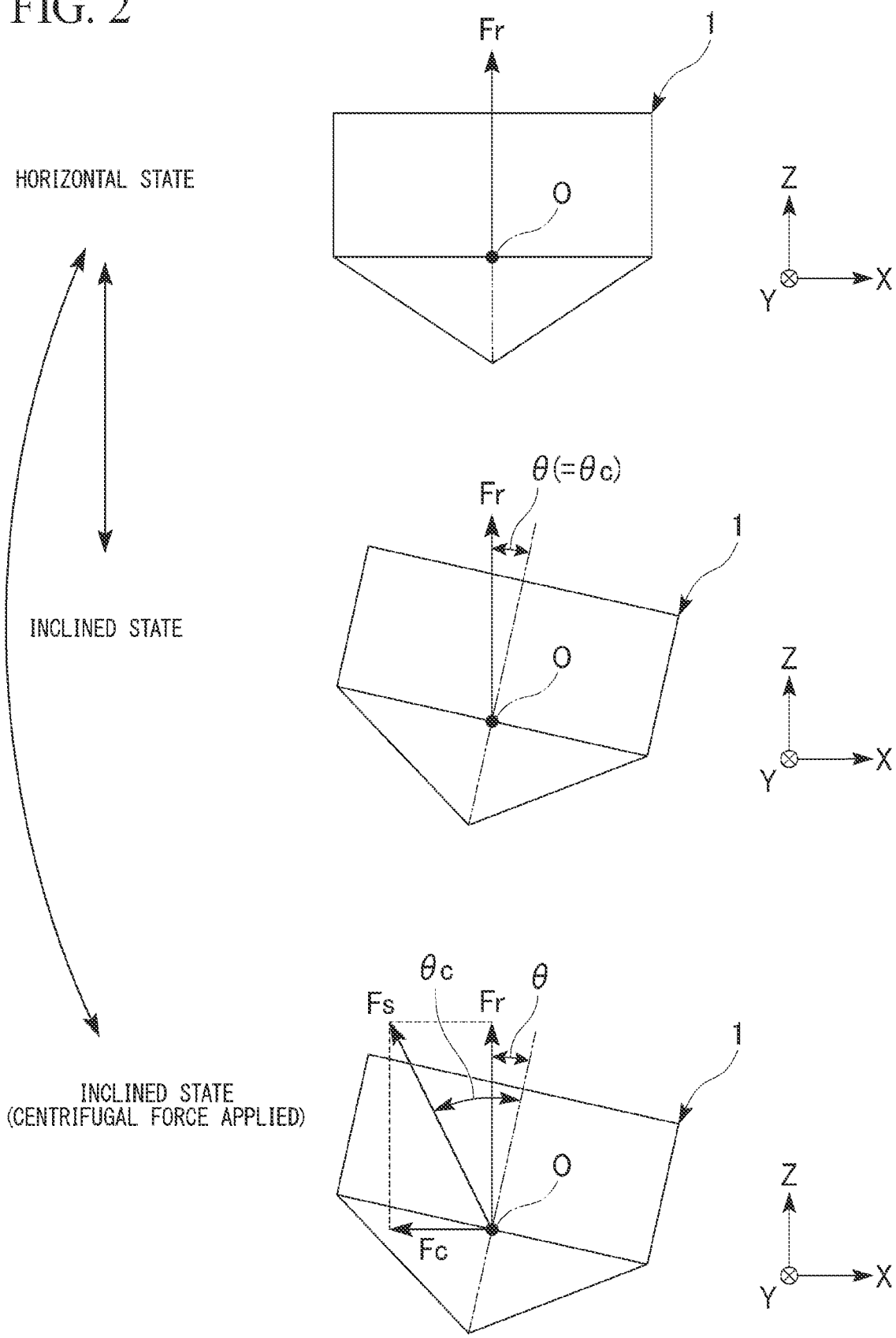
FIG. 2 is a view showing an example of the attitude of the ship according to the embodiment of the present invention and existence of a centrifugal force.

FIG. 2 is a view showing an example of existence of the attitude of the ship 1 according to the embodiment and a centrifugal force.

For example, an inclination θ of the ship 1 shown in FIG. 2 is an angle formed between the upward/downward direction and the vertical direction of the ship 1 when the ship 1 is inclined in the leftward/rightward direction from a horizontal moment when the upward/downward direction of the ship 1 is parallel to the vertical direction. The vertical direction is parallel to a direction of a reaction force Fr of a gravitational force applied to a center O (for example, a center of gravity or the like) of the ship 1.

The control device 17 corrects the inclination of the ship 1 acquired on the basis of the signal output from the inertia sensor 15 according to the centrifugal force acquired on the basis of the signal output from each of the rudder angle sensor 11 and the speed sensor 13.

For example, as shown in FIG. 2, during inclination of the ship 1 in a state in which a centrifugal force is not applied, an inclination θc of the ship 1 acquired on the basis of the signal output from the inertia sensor 15 is the same as the actual inclination θ of the ship 1. Meanwhile, during inclination of the ship 1 in a state in which a centrifugal force Fc is applied like during turning or the like of the ship 1, the inclination θc of the ship 1 acquired on the basis of the signal output from the inertia sensor 15 is different from the actual inclination θ of the ship 1. Since the inertia sensor 15 detects a resultant force Fs of the reaction force Fr of the gravitational force and the centrifugal force Fc applied to the ship 1, the inclination θc of the ship 1 acquired on the basis of the signal output from the inertia sensor 15 is an angle formed between the upward/downward direction of the ship 1 and the direction of the resultant force Fs. The inclination θc of the ship 1 based on the inertia sensor 15 changes with an increasing tendency which increases than that of the actual inclination θ of the ship 1 according to an increase in the centrifugal force Fc.

The control device 17 corrects the inclination θc of the ship 1 acquired on the basis of the signal output from the inertia sensor 15 so as to match with the actual inclination θ of the ship 1 according to the centrifugal force Fc acquired on the basis of the signal output from each of the rudder angle sensor 11 and the speed sensor 13.

As described above, the attitude detection device 10 of the embodiment can appropriately detect the attitude of the ship 1 by providing the control device 17 configured to correct the inclination θc of the ship 1 based on the output of the inertia sensor 15 on the basis of the output of each of the rudder angle sensor 11 and the speed sensor 13.

The attitude detection device 10 can appropriately detect the inclination θ of the ship 1 even when the acceleration detected by the inertia sensor 15 changes according to the centrifugal force Fc applied to the ship 1 by providing the control device 17 configured to correct the inclination θc of the ship 1, which is acquired on the basis of the acceleration detected by the inertia sensor 15, on the basis of the centrifugal force Fc.

According to the attitude detection device 10, since the inclination θ of the ship 1 can be appropriately detected, for example, it is possible to accurately correct each of the detection position and the detection direction according to horizontal recognition of an external camera mounted on the ship 1 and an external sensor such as millimeter wave radar or the like. In addition, for example, in comparison with the case in which the inclination of the ship 1 is detected by detection of a horizontal line through image recognition of the external camera mounted on the ship 1, it is possible to minimize an increase in processing load without requiring complicated calculation processing.

Variant

Hereinafter, a variant of the embodiment will be described. Further, portions that are the same in the above-mentioned embodiment are designated by the same reference signs and description thereof will be omitted or simplified.

While the inertia sensor 15 includes the acceleration sensor in the above-mentioned embodiment, there is no limitation thereto and, for example, the inertia sensor 15 may include a gyro sensor configured to detect an angular speed, in addition to the acceleration sensor.

In this case, for example, even when the inclination of the ship 1 cannot be accurately detected due to an offset error of the gyro sensor, a drift of the detection value, or the like, it is possible to easily accurately detect the inclination θ of the ship 1 according to the output of the acceleration sensor.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An attitude detection device mounted on a ship, the attitude detection device comprising:

a rudder angle sensor configured to detect a rudder angle of the ship and output a signal of a detection value of the rudder angle;

a speed sensor configured to detect a speed of the ship and output a signal of a detection value of the speed;

a multi-axis acceleration sensor configured to detect an inertial force applied to the ship and output a signal of a detection value of an acceleration related to the inertial force; and a processing device configured to, based on the signal of the detection value of the rudder angle, the signal of the detection value of the speed, and the signal of the detection value of the acceleration related to the inertial force, control the ship the processing device acquires an inclination of the ship, which is an angle of an upward/downward direction of the ship with respect to a vertical direction, on the basis of the acceleration detected by the multi-axis acceleration sensor, and corrects the inclination of the ship on the basis of a centrifugal force applied to the ship, wherein the vertical direction is parallel to a direction of a reaction force of a gravitational force applied to a center of gravity of the ship, wherein the processing device further acquires the centrifugal force on the basis of the signal output from each of the rudder angle sensor and the speed sensor, wherein, in a state the centrifugal force is applying to the ship, the processing device corrects the inclination of the ship, which is acquired as an angle of the upward/downward direction of the ship with respect to a direction of a resultant force of the reaction force of the gravitational force, such that a corrected inclination of the ship is recognized as an angle of the upward/downward direction of the ship with respect to the direction of the reaction force by omitting the centrifugal force, and wherein the processing device is further configured to correct each of a detection position and a detection direction according to horizontal recognition of an external camera mounted on the ship and an external sensor based on the corrected inclination of the ship.

* * * * *